C. R. DAVIS.
HAY LOADER.
APPLICATION FILED AUG. 19, 1912.
1,076,194.
Patented Oct. 21, 1913.
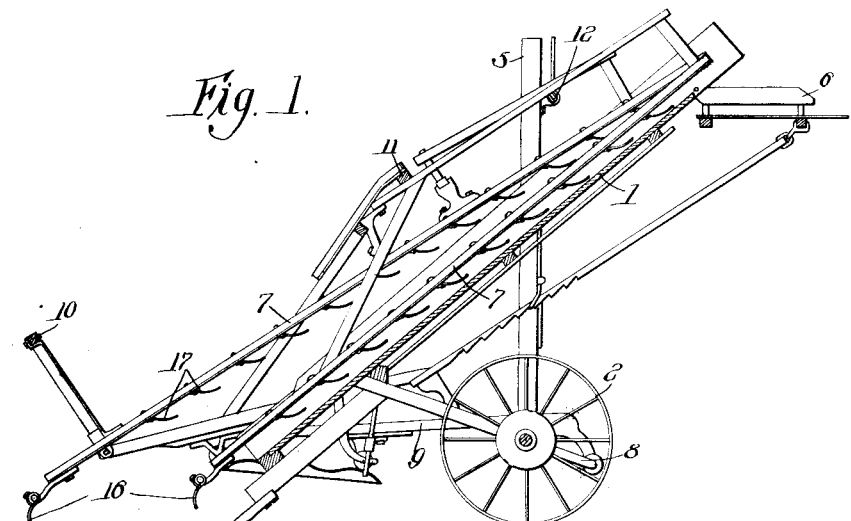
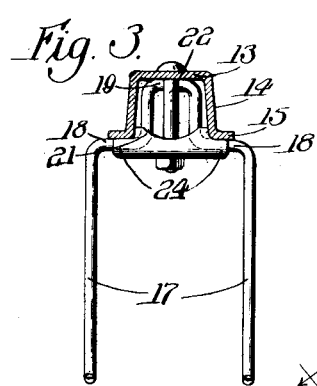
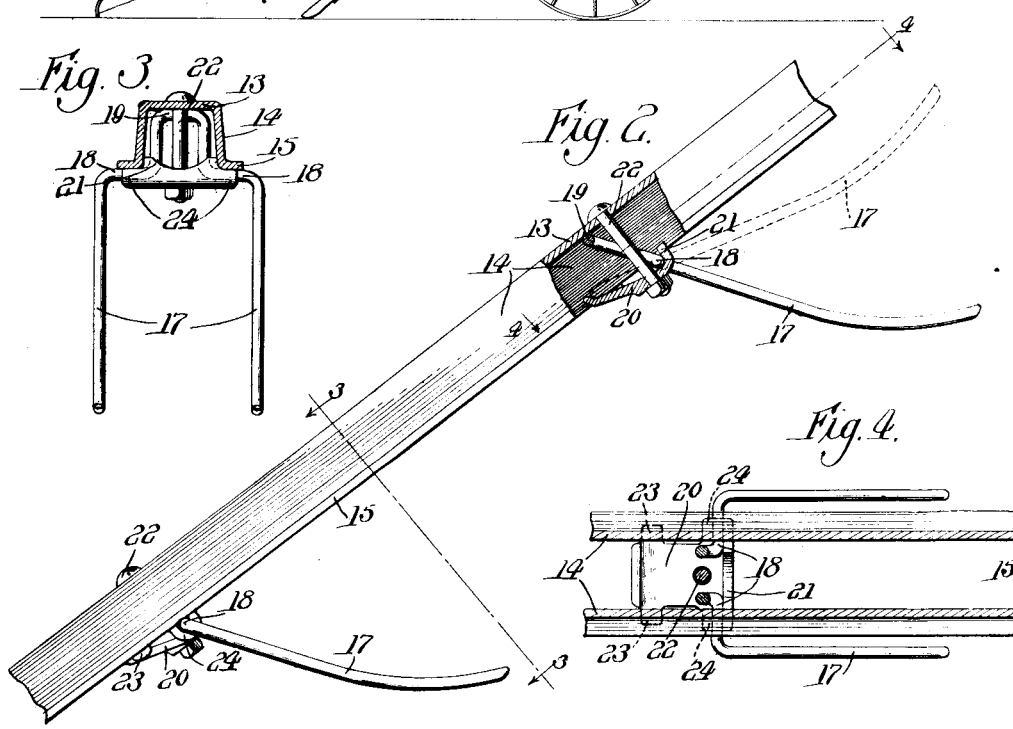
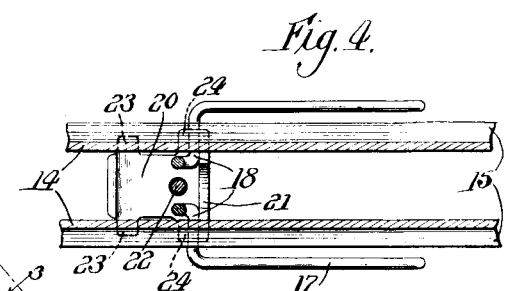
Witnesses:
John F. McCanna Jr.
Gladys Ward
Inventor:
Calvin R. Davis
By A. O. Behel
Atty.

UNITED STATES PATENT OFFICE.

CALVIN R. DAVIS, OF CHICAGO HEIGHTS, ILLINOIS, ASSIGNOR TO EMERSON-BRANTINGHAM COMPANY, OF ROCKFORD, ILLINOIS, A CORPORATION OF ILLINOIS.

HAY-LOADER.

1,076,194.     Specification of Letters Patent.     Patented Oct. 21, 1913.

Application filed August 19, 1912. Serial No. 715,780.

*To all whom it may concern:*

Be it known that I, CALVIN R. DAVIS, a citizen of the United States, residing at Chicago Heights, in the county of Cook and State of Illinois, have invented certain new and useful Improvements in Hay-Loaders, of which the following is a specification.

This invention relates to hay loaders, the type that is drawn behind a wagon or rack in order to elevate the hay from the ground to the wagon, and the general construction of this loader is substantially as shown and described in Patent No. 985,218, dated Feb. 28, 1911. In the present construction of hay loaders of this type, the rake-bars, those that carry the rake-teeth and have a reciprocating movement to elevate the hay, have been constructed of wood because of their being light, inexpensive and easy to manufacture. But this type of rake-bar has had many bad features. Because of the necessity of its suspension points being so far separated, the center portion thereof, after standing idle and being subject to all kinds of weather conditions, sags, thus making its operation inefficient; also the bars become warped and twisted, and are easily damaged and broken.

In applicant's hay rake, he has constructed a rake-bar that eliminates these bad features and still retains its lightness, inexpensiveness and easiness to manufacture, and insures a much greater longevity.

In the accompanying drawing: Figure 1 is a longitudinal vertical section through a hay loader, as shown in the above mentioned patent, showing the application of my improved rake-bar. Fig. 2 is an enlarged side view of a section of the rake-bar, a part being shown in section. Fig. 3 is a section on the line 3—3 of Fig. 2. Fig. 4 is a section on the line 4—4 of Fig. 2.

The hay loader comprises an elevator or conveyer-frame 1 mounted on carrying-wheels 2, the frame being supported by the standards 5, and having an adjustable conveyer-section 6 pivoted at its upper end. The rake-bars 7 receive their movement through the medium of cranks 8 operating concentrically with the carrying-wheels, and pitmen 9 which operate the cross-racks 10 and 11 which are connected to the rake-bars, the rake-carriers being suspended at their upper ends by the roller-bar 12; further description of this hay loader is deemed unnecessary, except as to that which relates to this invention.

The rake-bars 7 are made of light channel-iron and have a top portion 13 and depending sides 14, the sides turned out forming shoulders 15. Mounted upon these rake-bars are a plurality of teeth which are adapted to elevate the hay along the elevator-frame, and gathering teeth 16 at the end of the carrier to gather the hay from the ground and lift it to said elevator-frame. The rake-teeth are formed from one piece of wire-rod, having prongs 17, shoulders 18, and head portions 19. The brackets 20 have an upturned portion 21 extending above the shoulders 15, and formed therewith are two laterally extending arms 24 adapted to form a pivotal support for the shoulders 18 of the rake-teeth. A bolt 22 clamps this bracket to the rake-bar, the lugs 23 forming a further holding surface for the bracket. In the normal lifting position the teeth assume a position as shown in full lines, but when the rake-bar is carried back to gather new hay, the teeth will pivot on their shoulders 18, assuming a position as shown in dotted lines in Fig. 2, thereby allowing the rake-bar to pass easily over the upgoing hay and without much friction therewith.

I claim as my invention:

1. In a hay loader, the combination of an elevator-frame, carrying-wheels, a plurality of reciprocable longitudinally disposed rake-bars comprising channel bars having their open sides faced downward, brackets secured thereto at said open sides, rake-teeth pivotally supported by said brackets, each rake-tooth formed with a head adapted to contact the top portion of its channel bar to limit the pivotal movement of the rake-teeth, and means for operating the rake-bars in a longitudinal movement.

2. In a hay loader, the combination of an elevator-frame, carrying-wheels, a plurality of reciprocable longitudinally disposed rake-bars comprising channel bars having their open sides faced downward, rake-teeth pivotally carried by said channel bars at the open sides thereof, means extending into the channels of said bars for limiting the pivotal movement of said rake-teeth, and means for operating the rake-bars in a longitudinal movement.

3. In a hay loader, the combination of an elevator-frame, carrying-wheels, a plurality of reciprocable longitudinally disposed rake-bars comprising channel-iron bars having their open side faced downward, brackets secured to the open face of said channel-bars, rake-teeth supported by said brackets and having a portion extending into the channels of the channel-bars, and means for operating the rake-bars in a longitudinal movement.

4. In a hay loader, the combination of an elevator-frame, carrying-wheels, a plurality of reciprocable longitudinally disposed rake-bars comprising channel-iron bars having spaced depending sides and shoulders formed at the base thereof, brackets secured to said channel-iron bars and adapted to be held against said shoulder portions, rake-teeth supported by said brackets and having a portion extending into the channels of the channel-bars, and means for operating the rake-bars in a longitudinal movement.

5. In a hay loader, the combination of an elevator-frame, carrying-wheels, a plurality of reciprocable longitudinally disposed rake-bars comprising channel-iron bars having spaced sides formed with shoulders, brackets secured to the channel-iron bars, rake-teeth supported thereby, said rake-teeth being formed with shoulder portions that are held against and pivoted upon the shoulder portions of the channel-iron bars, and means for operating the rake-bars in a longitudinal movement.

6. In a hay loader the combination of an elevator-frame, carrying-wheels, a plurality of reciprocable longitudinally disposed rake-bars comprising bars having spaced side members, the under sides of said bars being open, rake-teeth pivotally carried at said open sides, by said side members and having a portion extending between said spaced sides and adapted to contact with a rigid portion of a bar, and means for operating the rake-bars in a longitudinal movement.

7. In a hay loader, the combination of an elevator-frame, carrying-wheels, a plurality of reciprocable longitudinally disposed rake-bars comprising bars having spaced side members, rake-teeth pivotally carried by said side members, each rake-tooth, having an extension from its pivoted support and adapted to extend intermediate said spaced sides, and contact with a rigid portion of its rake-bar to limit the pivotal movement of the rake-tooth, and means for operating the rake-bars in a longitudinal movement.

8. In a hay loader the combination of an elevator-frame, carrying-wheels, a plurality of reciprocable longitudinally disposed rake-bars having spaced side members having their open faced portions faced downward, rake-teeth pivotally supported by the rake-bars, each rake-tooth having an extension extending between said side members and adapted to contact with a portion of its bar to limit the pivotal movement of the rake-tooth, and means for operating the rake-bars in a longitudinal movement.

9. In a hay loader, the combination of an elevator-frame, carrying-wheels, a plurality of reciprocable longitudinally disposed rake-bars comprising channel bars having their open faced portions faced downward, rake-teeth pivotally carried by said channel bars and having a stop portion located in the open portions of said channel bars, and means for operating the rake-bars in a longitudinal movement.

In testimony whereof I have hereunto set my hand in presence of two subscribing witnesses.

CALVIN R. DAVIS.

Witnesses:
J. S. HITCHARD,
C. F. SMITH.